United States Patent
Vilner et al.

(10) Patent No.: US 7,329,315 B1
(45) Date of Patent: Feb. 12, 2008

(54) COPPER PHTHALOCYANINE BLUE PIGMENT COMPOSITION AND WATER BORNE DISPERSION THEREOF

(75) Inventors: Stanislav Vilner, Parsippany, NJ (US); Tatiana N. Romanova, Loveland, OH (US); Mark Ortalano, Cincinnati, OH (US); George H. Robertson, Loveland, OH (US); Russell J. Schwartz, Montgomery, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 11/636,621

(22) Filed: Dec. 11, 2006

(51) Int. Cl.
*C09B 47/04* (2006.01)
*C09B 47/30* (2006.01)

(52) U.S. Cl. ............... 106/413; 106/410; 106/411; 106/412; 540/122; 540/139; 540/140; 540/141

(58) Field of Classification Search ............... 106/410, 106/411, 412, 413; 540/122, 139, 140, 141
See application file for complete search history.

(56) References Cited

U.S. PATENT DOCUMENTS

| | | | |
|---|---|---|---|
| 4,104,277 A | | 8/1978 | Langley et al. |
| 4,158,572 A | | 6/1979 | Blackburn et al. |
| 4,284,729 A | * | 8/1981 | Cross et al. ............... 521/158 |
| 4,640,690 A | * | 2/1987 | Baumgartner et al. ......... 8/506 |
| 5,135,972 A | * | 8/1992 | Kluger et al. ............... 524/88 |
| 5,149,800 A | * | 9/1992 | Kluger et al. ............... 540/123 |
| 5,177,200 A | | 1/1993 | Kluger et al. |
| 5,270,363 A | * | 12/1993 | Kluger et al. ............... 524/90 |
| 5,296,033 A | | 3/1994 | Dietz et al. |
| 5,296,034 A | | 3/1994 | Dietz et al. |
| 5,534,055 A | * | 7/1996 | Gerson et al. ............... 106/413 |
| 5,728,204 A | * | 3/1998 | Sattar et al. ............... 106/411 |
| 5,837,045 A | * | 11/1998 | Johnson et al. ............ 106/31.85 |
| 6,056,814 A | | 5/2000 | Kato et al. |
| 6,379,451 B1 | | 4/2002 | Kitamura et al. |

FOREIGN PATENT DOCUMENTS

| | | |
|---|---|---|
| EP | 0 699 720 A1 | 3/1996 |
| EP | 0 787 775 A2 | 8/1997 |

* cited by examiner

*Primary Examiner*—Anthony J. Green
(74) *Attorney, Agent, or Firm*—Dickstein Shapiro LLP

(57) ABSTRACT

Phthalocyanine blue pigments and pigment dispersions for water-borne inks and coatings are described. The pigments are produced by dry milling phthalocyanine blue and a polymeric dispersant, optionally with inorganic fillers and other additives, to obtain a material with improved coloristic, rheological, and stability properties. The resulting activated crude is then processed directly into water-based pigment dispersion with additives and/or surfactants to facilitate conversion to pigmentary form while maintaining the desirable green and clean shade.

30 Claims, No Drawings

COPPER PHTHALOCYANINE BLUE PIGMENT COMPOSITION AND WATER BORNE DISPERSION THEREOF

BACKGROUND OF THE INVENTION

Phthalocyanine pigments of the beta modification are well known in the art as green shade blue pigments used in a wide variety of applications including inks, coatings, plastics, and textiles among the others. Conventional methods for preparing pigments in the beta-form include subjecting the synthesis formed coarse-crystalline material (crude phthalocyanine) to either wet milling in the presence of milling aids and solvents, for example, salt attrition with glycols, or by dry milling without milling aids and with subsequent treatment with solvents or their mixtures with water. Once the pigment from these processes is dried, it can then be dispersed into water or solvent systems by known milling techniques, such as bead milling. Numerous modifications and combinations of these processes are also described in the technical literature. In general, these conventional methods have the disadvantages of being long multi-step procedures and thus very expensive and generating large amounts of wastewater.

U.S. Pat. No. 5,296,034 discloses copper phthalocyanine pigments and pigment preparations in the alpha-phase that are prepared by first wet milling a crude in the form of a water slurry at pH of 7-12 in a stirred bead mill operated at a power density more than 2.5 kW per liter of milling space followed by contact with a non-crystallizing additive and treatment with organic solvents such as alkanols. Despite the fact the process is quite short due to very aggressive wet activation step and the final material has good coloristic properties, the need to regenerate the solvent and isolate the pigment makes the process complex and expensive. To obtain the pigment in 100% beta-modification, the wet milling is carried out in aqueous isobutanol, as is described in U.S. Pat. No. 5,296,033.

U.S. Pat. No. 4,104,277 describes the process of the dry milling of a copper phthalocyanine crude followed by treatment of the activated material with emulsion of water, surfactant, liquid aromatic amine, and resin. The use of highly toxic amines in this process creates serious environmental problems.

Optionally, some esters, such a methyl benzoate, E.P. 0699720 A1, and dimethyl succinate, E.P. 0787775 A2, have been used as a solvent for an activated crude treatment. Upon completion of the pigmentation step, the solvent is hydrolyzed by heating the pigment slurry with caustic.

U.S. Pat. No. 4,158,572 describes a process of producing a β-modification phthalocyanine pigment composition by dry grinding a crude phthalocyanine, stirring the ground material with an aqueous medium containing a non-ionic surfactant and water soluble resin and isolating the pigmentary product. The required isolation in this process is an economic disadvantage, and in the course of the isolation, most of the surfactant is transferred into wastewater thereby creating an environmental problem.

U.S. Pat. No. 6,056,814 and U.S. Pat. No. 6,379,451 disclose pigment compositions that are produced by dry milling a crude phthalocyanine in the presence of a surfactant and a water-soluble resin. The resulting pigment composition is readily dispersed into an aqueous system to obtain aqueous pigment dispersion. Despite the fact the process is simple and the pigment composition easy dispersed, it is limited by systems based on acrylic resins. In addition, the shade of the composition and viscosity are difficult to control and the pigment is not stable against flocculation.

SUMMARY OF THE INVENTION

This invention pertains to a phthalocyanine blue pigment composition and the process of manufacture of phthalocyanine blue pigments and pigment dispersions. More particularly, the process involves dry milling phthalocyanine blue crude, optionally with inorganic fillers, additives, surfactants and resins, to obtain an activated crude composition, followed by processing the resulting activated crude directly into a dispersion with surfactants and/or additives to facilitate conversion to pigmentary form while maintaining a desirable green and clean shade. A polymeric dispersant is incorporated at any stage of the process, that is, in the course of dry milling, pre-mixing activated material with water and other components of the dispersion, milling of the pre-mix, admixing with final dispersion or any combination of thereof. This process results in a product that has excellent coloristic, rheological, and stability properties and is more economical, safer and environmentally acceptable than prior methods, such as milling with inorganic salts and solvents.

The dispersions are suitable for pigmentation of water-borne inks and coatings.

DETAILED DESCRIPTION OF THE INVENTION

In accordance with the present invention, a phthalocyanine blue crude is processed to form a pigmentary dispersion and this process is modified by the use of a polymeric dispersant.

Thus, the crude is dry milled to obtain an activated pigment composition. Use of salt or similar milling aids is not required. The crude can be any known metal phthalocyanine blue complex or metal free. Preferably, metal free or complexes with Cu, Co, Ni, Al, or Fe are employed. The crude can contain from 0 to about 16%, preferably 0 to about 5%, of halogen, alkyl-, aryl-, oxy-, alkaryl-, carboxy-, carbamido-, sulfo-, cyano-, amino-, sulfonamido-groups, and any combination of thereof, but is not limited to these groups. It can be made by a solvent or solvent-free process. Suitable milling equipment includes, but not limited by, ball mills, attritors, roll mills, vibration mills and the like. Depending on the type of the milling equipment and desired color and other properties, the milling time ranges from 0.5 to 72 hours, preferably 1-24 hours. The temperature of the milling process can be in range from 20 to 140° C., preferably 50-80° C. Depending on the milling composition, milling time and temperature, the resulting activated crude generally contains about 25% to 100% β-phase phthalocyanine.

The activated crude is then mixed with water, surfactants, and optionally resins and/or other additives (such as crystal modifiers, non-flocculating/non-crystallizing agents, humectants, biocides, defoamers and flow and leveling aids), at elevated temperature, generally 15-150° C., and preferably at 90-98° C., for a duration of time necessary for pigmentation and crystal form conversion. Mixing usually is for 1-6 hours, and preferably 2-4 hours. Any type of mixing and homogenizing equipment is suitable for premixing; however, high speed mixers operated at 2,000-12,000 rpm are more preferable. The amount of water should be only that required to form a concentrated premix in which the phthalocyanine concentrations is about 20 to 70%, preferably about 35 to 50%. The amount of surfactants and additives needed for pigmentation and crystal phase conversion is in the range of about 3 to 35%, preferably about 8 to 20%. The pre-mix is then milled for a time sufficient to provide a stable dispersion with desirable characteristics. Mean pigment particle size is in a range 40-400 nm, preferably 80-250 nm. Suitable milling equipment include, but not limited by, horizontal or vertical bead mills, basket mills, attritors, ball mills, vibration mills. Any known type and size of media can be employed, for example, glass, ceramic, sand, polymeric, and metal media. The resulting dispersion can then be mixed with additional surfactants, resins, water, humectants, biocides, extenders and other additives to form a final composition, which can then be used to color inks and coatings.

Optionally, non-flocculating, non-crystallizing and other additives, surfactants, resins, extenders could be incorporated at the dry milling state or at any other stage of the process. The extender can be any known synthetic or natural extenders from the following classes: talc, clay, mica, carbonates, silica, silicates, phosphates and sulfates; or mixtures of same.

The surfactants can be natural or synthetic, and can be of the following classes: anionic, nonionic, cationic or amphoteric, or a mixture thereof. Useable anionic surfactants include, but are not limited to, phosphate esters, carboxylic acids, alkyl-, aryl- and alkaryl-sulfonates and sulfates. The nonionic surfactants include, but are not limited to, alkyl phenol ethoxylates/propoxylates, EO/PO block copolymers, linear or branched alcohol-, amino-, amido-, carboxyethoxylates/propoxylates, esters, but are not limited to these only. Non-limiting examples of cationic surfactants are aliphatic, alicyclic and heterocyclic primary, secondary, tertiary and quaternary amines, imides, and imines, but are not limited to these. Natural surfactants include lecithin, fatty acids, glucamides, glycerides, polysaccharides, among others.

Humectants include, but are not limited to, propylene glycol, ethylene glycol, diethylene glycol, polyethylene glycols, sorbitol and glycerine.

Crystal modifiers include, but not limited to, pyrrolidones, alkylpyrrolidones, glycols, dibasic esters, and amines.

Non-crystallizing and non-flocculating additives can be, but are not limited to, phthalimidomethylene phthalocyanine, naphthalimidomethylenes phthalocyanine; salts of phthalocyanine sulfonic acids with primary, secondary, tertiary and quaternary amines or/and etheramines; sulfonamides of phthalocyanine and primary, secondary amines, diamines, polyamines, polyimines or etheramines; amides and esters of phthalocyanine carboxylic acids; linear and branched alkyl-, arylol- or alkanol phthalocyanine; amino-, aminoalkyl-aminoaryl-phthalocyanines; and mixtures thereof.

Other additives include, but are not limited to, biocides, defoamers and flow and leveling aids.

A polymeric dispersant is incorporated at any stage of the process, that is, in the course of dry milling, pre-mixing activated material with water and other components to form the premix, milling of the pre-mix, admixing with materials to form the final dispersion or any combination of thereof. The amount of polymeric dispersant is in a range about 0.5-25.0%, more preferably about 2-10%, based on the weight of the phthalocyanine blue crude. A content of additive less than about 0.5% does not demonstrate desirable dispersion properties and effects, whereas a concentration higher than 25% can be used but does not provide any further advantages and is not economical.

The polymeric dispersant is a poly(oxyalkylene) modified dialkylsuccinyl succinate or phthalocyanine, or a combination thereof.

The poly(oxyalkylene) modified dialkylsuccinyl succinate are the reaction product of a dialkylsuccinyl succinate, i.e., dialkyl-2,5-dioxo-1,4-cyclohexanedicarboxylate, with one or more amines, at least one of which is poly(oxyalkylene) modified. The alkyl groups of the succinate can have 1 to about 18 carbon atoms, and preferably are lower alkyl of 1 to 4 carbon atoms, and most preferably are methyl. The alkyl groups can be straight chained or branched.

The amines generally conform to the formula $R—(NH_2)_n$ in which n is 1 or 2, and R is straight, branched or cyclic, saturated or unsaturated group such as alkyl, alkenyl, alkynyl or aryl group or alkaryl or heteroaryl or heterocyclic or ether or ester or ketone or amide or urea or urethane group or combinations thereof, provided that at least one amine is polymeric in that it has a number average molecular weight of at least about 200, preferably at least about 1000.

In general, any alkyl moiety in a R-group has 1 to about 30 carbon atoms, preferably about 1 to 6 carbon atoms, and any cyclic moiety contains about 4 to about 8 carbon atoms, preferably about 5 to 6 carbon atoms.

The R-group can be unsubstituted or substituted by, for instance, with one or more functional groups. Examples of functional groups include, but are not limited to hydroxide, carboxyl, halogen, CN, primary, secondary or tertiary amino, thiol, sulfonate, sulfates, phosphate, phosphonate, and the like. In one preferred embodiment, the R-group is or contains a poly(oxyalkylene) moiety.

Examples of useful amines include, but are not limited to, $NH_3$, methylamine, ethylamine, n-propylamine, n-butylamine, n-hexylamine, hydroxyethylamine, hydroxylamine, hydrazine, dimethylaminoethylamine, diethylaminoethylamine, 2-ethylhexylaminoethylamine, stearylaminoethylamine, oleylaminoethylamine, dimethylaminopropylamine, dibutylaminopropylamine, diethylaminobutylamine, dimethylaminoamylamine, diethylaminohexylamine, piperidinomethylamine, piperidinoethylamine, piperidinopropylamine, pipecolinoethylamine, pipecolinopropylamine, imidazolopropylamine, morpholinoethylamine, morpholinopropylamine, 1,2-cyclopentanediamine, 1,2-cyclohexanediamine, aniline, o-phenylenediamine, 2,3- or 1,8-diaminonaphthalene, 2,3- or 3,4-diaminopyridine, 9,10-diaminophenanthrene, N,N-dimethyl-1,4-phenylenediamine and the like.

In the preferred poly(oxyalkylene)-containing amines, each oxyalkylene group contains 1 to about 4 carbon atoms, and preferably about 2 to 3 carbon atoms. The commercially available poly(oxyalkylene) amines generally contain a polyether backbone that is based either on propylene oxide, ethylene oxide or mixed propylene oxide and ethylene oxide. The poly(oxyalkylene) monoamines are prepared by reaction of a monohydric alcohol, followed by conversion of the resulting terminal hydroxyl group to an amine. The poly(oxyalkylene) diamines are commercially available as several types, e.g. diamine-terminated polypropylene glycols, polyether diamines based on a predominantly polyethylene glycol backbone as well as urea condensates of such polyether diamines.

More than one different high molecular weight amines can be employed if desired.

When a difunctional reactant is employed, it can link two dialkylsuccinyl succinate compounds together, thereby forming a polymeric dispersant.

The succinate-amine reaction is effected at a temperature of about 20° to 180° C., preferably at about 100 to 130° C. When two or more amines are used, the reaction can be conducted stepwise. If desired, the reaction can be allowed to continue for a sufficiently long time or sufficiently high temperature for further modification such as oxidation, cyclization, or functional group modification. No solvent is required.

The dispersant of the present invention will generally conform to the formula

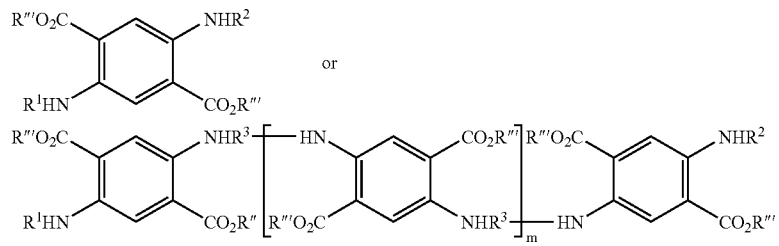

or an isomer thereof, or a mixture of them.

In the above formulae, m can be 1 to 10, and R''' corresponds to the alkyl moieties of the succinate, $R^1$, $R^2$ and $R^3$ can be the same or different and each corresponds to a straight, branched or cyclic aliphatic saturated or unsaturated group such as alkyl, alkenyl, alkynyl or aryl group or alkaryl or heteroaryl or heterocyclic or ether or ester or ketone or amide or urea or urethane group or combinations thereof, provided that at least one of these R groups is or contains a poly(oxyalkylene) moiety, as described above.

The poly(oxyalkylene) modified phthalocyanine is a material of the formula MPc—$[Z(CH_2CH_3CHO)_x(CH_2CH_2O)_y$—$CH_3]_n$ in which Pc is a phthalocyanine radical; M is hydrogen, any metal (preferably copper, cobalt, nickel, iron or aluminum); x is 0 to about 30; y is 0 to about 100; x plus y is at least 3; and n is 0.1-6, preferably 1-3. The Pc radical can be substituted with 0-8 substituents, each of which can be halogen, alkyl-, alkoxy-, alkylthio-, aryloxy-, arylalkyloxy-, sulfo-, sulfamido-, carboxy-, carbamido-, amino-, aminoalkyl-, or cyano-group; Z is —$SO_2NR^1$—, —$NCONR^1$—, —NCOO—, —$SO_3N^+R^1R^2R^3$—, —$CH_2NR^1$—, —$CONR^1$—, —COO— group or any combination thereof; $R^1$, $R^2$, $R^3$ are hydrogen, substituted or not substituted linear or branched alkyl, aryl, alkylaryl or poly(oxyalkylene) glycol groups.

One of the preferred examples of poly(oxyalkylene) modified phthalocyanine can be prepared by reacting at a temperature of e.g., from about 0° C. to about 100° C., a phthalocyanine compound of the formula Pc—$(SO_2X)_n$ with an amine of the formula $HN(R_2)Y$ wherein X is selected from Cl, F, Br, or I; and $R^2$ is hydrogen or unsubstituted or substituted alkyl, cycloalkyl, aryl or Y, and Y is a poly(oxyalkylene) glycol moiety. No solvent is required but if desired reaction media such as water, alcohols or ethers can be used. Acid acceptors, i.e., bases such as alkali metal carbonates, hydroxides or tertiary amines can be helpful to neutralize acid generated during the reaction.

Further details about the poly(oxyalkylene)sulfonamidophthalocyanine dispersants can be found in U.S. Pat. No. 5,177,200, the disclosure of which is incorporated herein by reference.

The present invention results in phthalocyanine pigment dispersions with excellent coloristic properties, and which are produced by an economical manufacturing process without using hazardous acids, solvents, and any waste water.

In order to further illustrate the invention, various non-limiting examples are set forth below. In these, as throughout this specification and claims, all parts and percentages are by weight and all temperatures in degrees Centigrade unless otherwise indicated.

EXAMPLE 1

A ball mill having 6.5 liter capacity was charged with 12,260 parts of 5 cm diameter steel balls. 533.5 parts of a chlorine-free crude phthalocyanine and 16.5 parts of Polymeric Dispersant A were then added and the ball mill rotated for 24 hours at 60° C. The powder was discharged from the mill trough a screen that retained the grinding elements. The yield of activated material was 96.8% and the content of alpha-phase in the activated crude was of about 52%.

Polymeric Dispersant A:

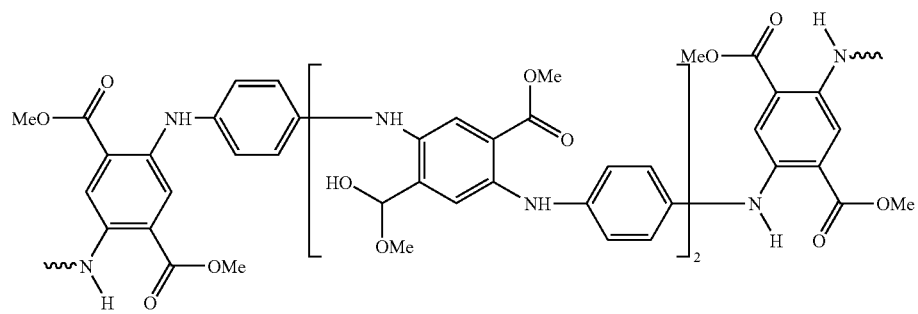

The wavy lines in the formula set forth indicate the polymeric nature of the chain rather than a specific number of carbon atoms.

Then, 258 parts of the activated crude, 48 parts of Igepal CA-887 (Rhodia), 19.8 parts of Vancryl 68 (as 30% solution in water), 2.1 parts of Surfadone LP-100 (ISP), 1.8 parts of a defoaming agent, and 270 parts of water were charged into 2 liter reactor and stirred for 2 hours at 95-97° C. and 5,000 RPM. The uniform slurry was cooled down to the room temperature and milled for 30 min in a horizontal bead mill with 0.7-0.8 mm ceramic media.

Polymeric Dispersant A was obtained by reacting dimethylsuccinyl succinate with a primary amine terminated poly(oxyethylene/oxypropylene) having a number average molecular weight of about 2000 and p-phenylenediamine.

COMPARATIVE EXAMPLE 1

Example 1 was repeated except that during preparation of the activated crude, the polymeric dispersant was omitted and 550 parts of the chlorine-free crude phthalocyanine were used. The yield of activated material was 99.6% and the content of the alpha-phase in the activated crude was about 58%.

EXAMPLE 2

The procedure of Example 1 was repeated, except that 27.5 parts of Polymeric Dispersant A and 522.5 parts of chlorine-free phthalocyanine crude were charged to the ball mill. The yield of activated material was 99.1% and the content of the alpha-phase in the activated crude was about 29%.

EXAMPLE 3

The procedure of Example 1 was repeated, except that 38.5 parts of Polymeric Dispersant A and 511.5 parts of the chlorine-free phthalocyanine blue was charged to the ball mill. Yield of activated material was 96.8% and the content of the alpha-phase in the activated crude was about 15%.

EXAMPLE 4

Charged to a 2 liter reactor were 240 parts of activated crude of Comparative Example 1, 18 parts of Polymeric Dispersant A, 48 parts of Igepal CA-887 (Rhodia), 19.8 parts of Vancryl 68 (as 30% solution in water), 2.1 parts of Surfadone LP-100 (ISP), 1.8 parts of defoaming agent, and 270 parts of water. The reaction mixture was stirred for 2 hours at 95-97° C. and 5,000 RPM. The uniform slurry was cool down to the room temperature and milled for 30 min a horizontal bead mill with 0.7-0.8 mm ceramic media.

EXAMPLE 5

The procedure of Example 1 was repeated, except 38.5 parts of Polymeric Dispersant B and 511.5 parts of chlorine-free phthalocyanine blue was charged to the ball mill. The yield of activated material was 98.4% and the content of the alpha-phase in the activated crude was about 33%.
Polymeric Dispersant B:
Pc—[SO$_2$—NH—(CHCH$_3$CH$_2$O)$_{10}$(CH$_2$CH$_2$O)$_{32}$—CH$_3$]$_2$ where Pc is a radical of copper phthalocyanine.

The characteristics of the milled slurries of the foregoing Examples are shown in the following Table:

| Example | Color strength % | dA | dB | Mean particle size, nm | Content (%) of α-modification in activated material, |
|---|---|---|---|---|---|
| Comparative 1 | 100.00 | Standard | Standard | 141 | 58 |
| 1 | 105.98 | −0.91 | −0.36 | 132 | 52 |
| 2 | 106.82 | −1.02 | 0.93 | 138 | 29 |
| 3 | 102.19 | −2.09 | 2.43 | 161 | 15 |
| 4 | 97.25 | −0.17 | 1.32 | 150 | 58 |
| 5 | 103.21 | −1.58 | −0.69 | 161 | 33 |

Various changes and modifications can be made in the invention without departing from the spirit and scope thereof. The various embodiments set forth were for the purpose of illustration only and were not intended to limit the invention.

What is claimed is:

1. A composition comprising milled phthalocyanine blue and a dispersant, wherein the dispersant comprises a poly (oxyalkylene) modified dialkylsuccinyl succinate or poly (oxyalkylene) modified phthalocyanine, or a combination thereof.

2. The composition of claim 1, wherein the dispersant is about 0.5 to 25% of the combination of phthalocyanine blue and dispersant.

3. The composition of claim 1, wherein the dispersant is about 2 to 10% of the combination of phthalocyanine blue and dispersant.

4. The composition of claim 1, wherein the phthalocyanine blue is metal-free or is a complex with copper, cobalt, nickel, aluminum or iron.

5. The composition of claim 1, wherein the dispersant is the reaction product of a dialkylsuccinyl succinate and a poly(oxyalkylene)-containing amine.

6. The composition of claim 5, in which the succinate is a di(lower alkyl)succinyl succinate and the amine is a further comprises p-phenylenediamine.

7. The composition of claim 6 in which the reaction product is of the formula

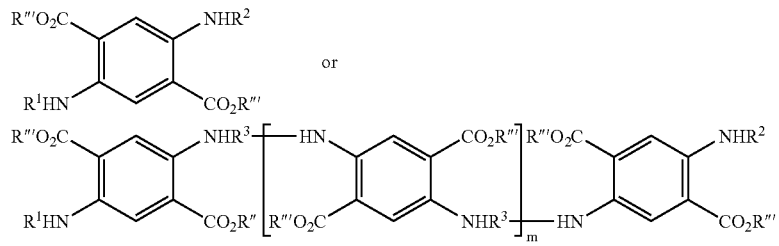

or an isomer thereof, and mixtures thereof, wherein m is 1 to 10, and R''' corresponds to the alkyl moieties of the succinate, $R^1$, $R^2$ and $R^3$ are the same or different and each is selected from the group consisting of alkyl, alkenyl, alkylene, alkenylene, alkynyl, alkynylene, aryl, arylene, oxy, amino, carbonyl, carbocyclic, heterocyclic, or combinations thereof, provided that at least one is or contains a poly(oxyalkylene) moiety.

8. The composition of claim 7, in which R''' is lower alkyl, and $R^1$ and $R^2$ comprise a poly(oxyalkylene) moiety.

9. The composition of claim 7, in which the succinate is a dimethylsuccinyl succinate and at least one of $R^1$, $R^2$ or $R^3$ is poly(oxyalkylene) in which each oxyalkylene group contains 2 or 3 carbon atoms.

10. The composition of claim 1, wherein the dispersant is of the formula MPc—[Z—$(CH_2CH_3CHO)_x(CH_2CH_2O)_y$—$CH_3]_n$ in which Pc is a phthalocyanine radical; M is hydrogen or a metal; Z is —$SO_2NR^1$—, —$NCONR^1$—, —NCOO—, —$SO_3N^+R^1R^2R^3$—, —$CH_2NR^1$—, —$CONR^1$—, —COO— group or a combination thereof; $R^1$, $R^2$, $R^3$ are individually hydrogen, alkyl, aryl, alkylaryl or poly(oxyalkylene) glycol groups; x is to about 30; y is 0 to about 100; x plus y is at least 3; and n is 0.1 to 6.

11. The composition of claim 1, wherein the dispersant is of the formula MPc—[$SO_2NR^1$—$(CH_2CH_3CHO)_x(CH_2CH_2O)_y$—$CH_3]_n$ in which Pc is a phthalocyanine radical; M is hydrogen or a metal; and $R^1$ is hydrogen, alkyl, aryl, alkylaryl or poly(oxyalkylene) glycol groups; x is 0 to about 30; y is 0 to about 100; x plus y is at least 3; and n is 0.1-6.

12. The composition of claim 1, wherein the milled phthalocyanine blue is an activated milled phthalocyanine blue crude.

13. The composition of claim 1, further comprising water.

14. The composition of claim 12, wherein the composition is a stable dispersion in which the mean particle size of the phthalocyanine blue is in the range of about 40 to 400 nm.

15. The composition of claim 12, comprising at least one member selected from the group consisting of resin, surfactant, humectant, extender, crystal modifier, non-crystallizing additive, and non-flocculating additive.

16. A process which comprises:
a) dry milling a phthalocyanine blue crude to form an activated crude,
b) mixing the activated crude with water and surfactant at elevated temperature to form a premix,
c) milling the premix to form a stable dispersion, and
d) mixing the stable dispersion with at least one member selected from the group consisting of surfactant, resins, additives, additional water, humectant, and extender, wherein at least one of a) through d) is effected in the presence of a dispersant which is a poly(oxyalkylene) modified dialkylsuccinyl succinate or poly(oxyalkylene) modified phthalocyanine, or a combination thereof.

17. The process of claim 16, wherein the a) milling is effected at 20 to 140° C. for 0.5 to 72 hours.

18. The process of claim 16, wherein the a) milling is effected at 50 to 80° C. for 1 to 24 hours.

19. The process of claim 16, wherein the b) mixing is effected at 75 to 140° C. for 1 to 6 hours.

20. The process of claim 16, wherein the dispersant is about 0.5 to 25% of the combination of phthalocyanine blue and dispersant.

21. The process of claim 16, wherein the dispersant is about 2 to 10% of the combination of phthalocyanine blue and dispersant.

22. The process of claim 16, wherein the phthalocyanine blue is metal-free or is a complex with copper, cobalt, nickel, aluminum or iron.

23. The process of claim 16, wherein the dispersant is the reaction product of a dialkylsuccinyl succinate and a poly(oxyalkylene)-containing amine.

24. The process of claim 23, wherein the dispersant in which the dialkylsuccinyl succinate is a di(lower alkyl) succinyl succinate and the amine further comprises p-phenylenediamine.

25. The process of claim 16 in which the reaction product is of the formula

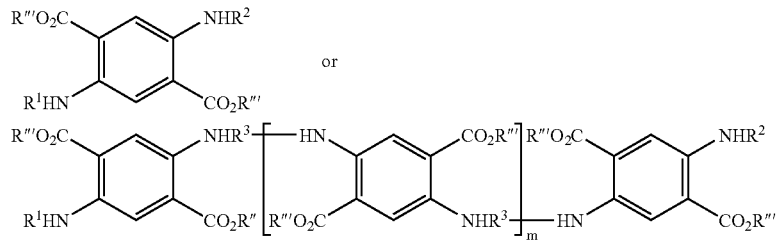

or an isomer thereof, and mixtures thereof, wherein m can be 1 to 10, and R''' corresponds to the alkyl moieties of the succinate, $R^1$, $R^2$ and $R^3$ are the same or different and each is selected from the group consisting of alkyl, alkenyl, alkylene, alkenylene, alkynyl, alkynylene, aryl, arylene, oxy, amino, carbonyl, carbocyclic, heterocyclic, or combinations thereof, provided that at least one of these R groups is or contains a poly(oxyalkylene) moiety.

26. The process of claim 25, in which $R^1$, $R^2$ and $R^3$ are independently selected from the group consisting of alkyl, alkenyl, alkylene, alkenylene, alkynyl, alkynylene, aryl, arylene, oxy, amino, carbonyl, carbocyclic, heterocyclic, or combinations thereof.

27. The process of claim 22, in which R''' is lower alkyl, and R comprises a poly(oxyalkylene) moiety.

28. The process of claim 22, in which the dialkylsuccinyl succinate is a dimethylsuccinyl succinate and at least one $R^{11}$ is poly(oxyalkylene) in which each oxyalkylene group contains 2 or 3 carbon atoms.

29. The process of claim 16, wherein the dispersant is of the formula MPc—[Z—$(CH_2CH_3CHO)_x(CH_2CH_2O)_y$—$CH_3]_n$ in which Pc is a phthalocyanine radical; M is hydrogen or a metal; Z is —$SO_2NR^1$—, —$NCONR^1$—, —NCOO—, —$SO_3N^+R^1R^2R^3$—, —$CH_2NR^1$—, —$CONR^1$—, —COO— group or a combination thereof; $R^1$, $R^2$, $R^3$ are individually hydrogen, alkyl, aryl, alkylaryl or poly(oxyalkylene) glycol groups; x is 0 to about 30; y is 0 to about 100; x plus y is at least 3; and n is 0.1-6.

30. The process of claim 29, wherein the dispersant is of the formula $MPc—[Z—(CH_2CH_3CHO)_x(CH_2CH_2O)_y—CH_3]_n$ in which Pc is a phthalocyanine radical; M is hydrogen or a metal; Z is —$SO_2NR^1$—, —$NCONR^1$—, —NCOO—, —$SO_3N^+R^1R^2R^3$—, —$CH_2NR^1$—, —$CONR^1$—, —COO— group or a combination thereof; $R^1$, $R^2$, $R^3$ are individually hydrogen, alkyl, aryl, alkylaryl or poly(oxyalkylene) glycol groups; x is 0 to about 30; y is 0 to about 100; x plus y is at least 3; and n is 0.1-6.

* * * * *